2 Sheets—Sheet 1.
G. H. CORLISS.
CUT-OFF AND WORKING VALVE FOR STEAM ENGINES.
No. 763. Reissued July 12, 1859.
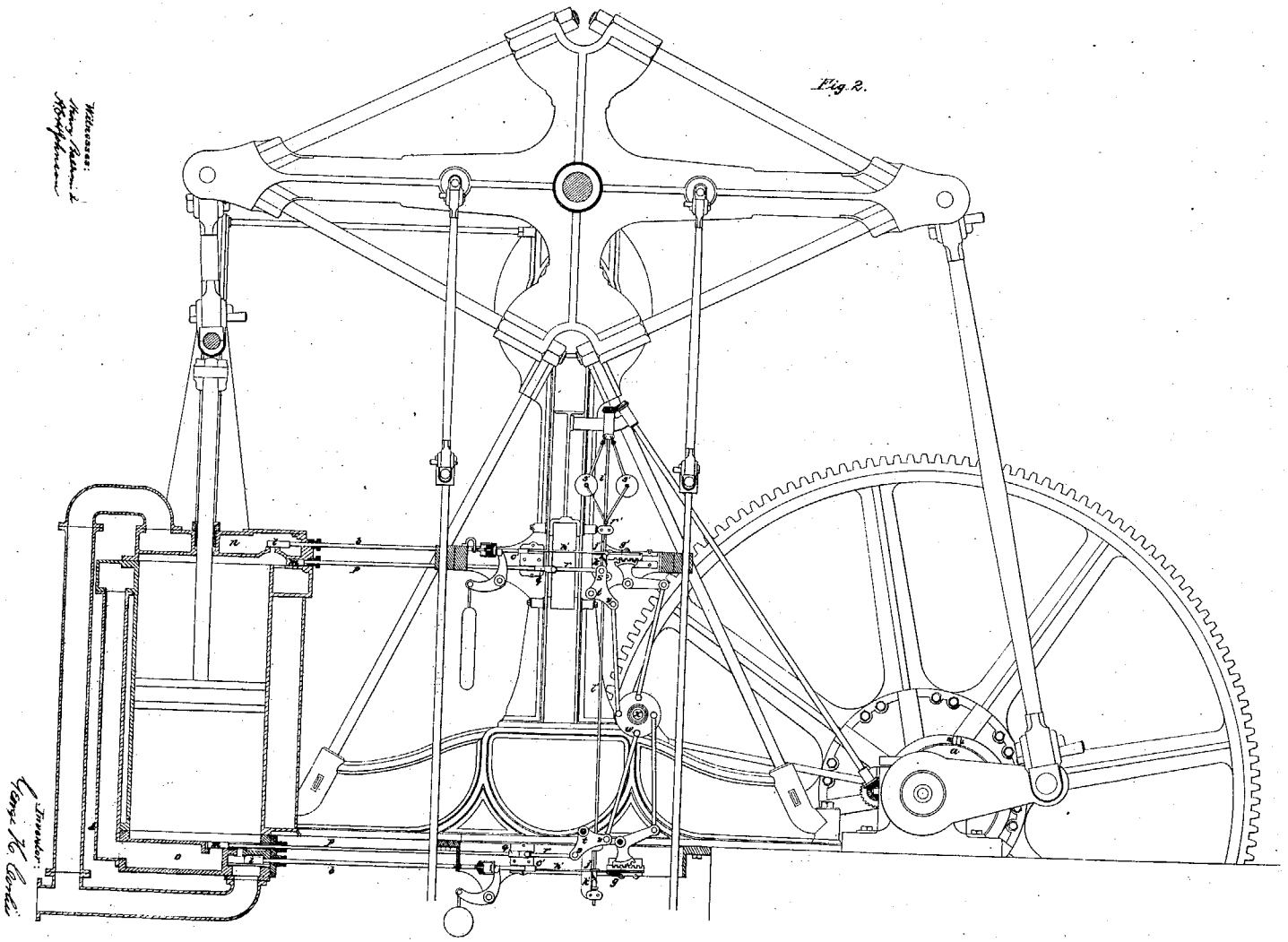
THE NORRIS PETERS CO., PHOTO-LITHO., WASHINGTON, D. C.

2 Sheets—Sheet 2.
G. H. CORLISS.
CUT-OFF AND WORKING VALVE FOR STEAM ENGINES.
No. 763. Reissued July 12, 1859.
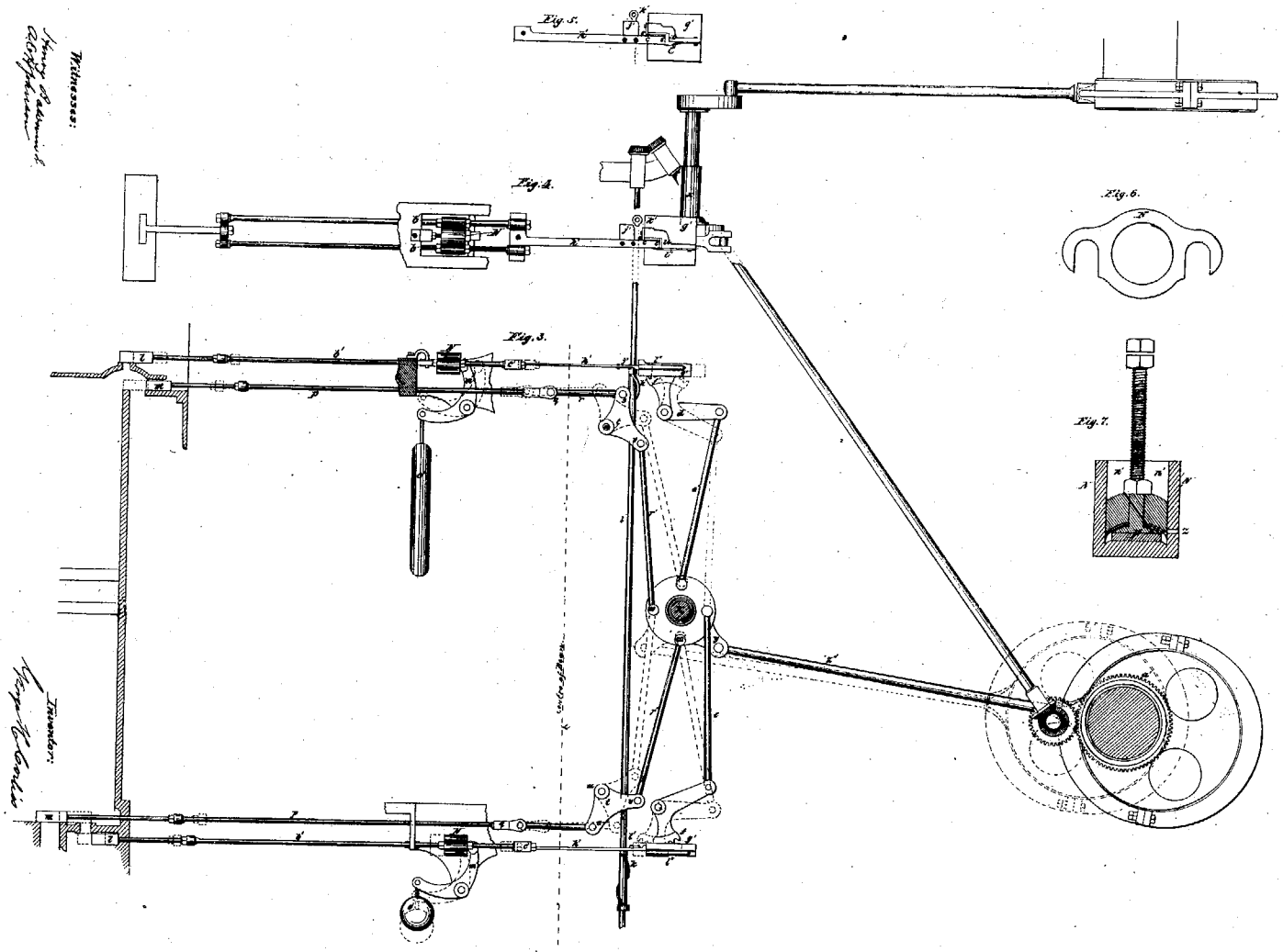
THE NORRIS PETERS CO., PHOTO-LITHO., WASHINGTON, D. C.

UNITED STATES PATENT OFFICE.

GEORGE H. CORLISS, OF PROVIDENCE, RHODE ISLAND.

IMPROVEMENT IN CUT-OFF AND WORKING-VALVES OF STEAM-ENGINES.

Specification forming part of Letters Patent No. 6,162, dated March 10, 1849; Reissue No. 200, dated May 13, 1851; Reissue No. 763, dated July 12, 1859.

DIVISION F.

*To all whom it may concern:*

Be it known that I, GEORGE H. CORLISS, of the city and county of Providence, in the State of Rhode Island, have invented a new and useful Improvement in Steam-Engines; and I do hereby declare that the following is a full, clear, and exact description of the principle or character which distinguishes it from all other things before known, and of the manner of making, constructing, and using the same, reference being had to the accompanying drawings, making part of this specification, in which—

Figure 2 represents a longitudinal vertical section through an engine embracing my improvements, the parts behind the plane of the section being shown in elevation. Fig. 3 represents an elevation of the valves and of the valve-gear of the same. Fig. 4 represents a plan thereof; Fig. 5, a separate section representing a link used in the valve-gear; Figs. 6 and 7, a plan and a section of an air-cylinder and piston for checking the motion of the valve apparatus.

The same letters indicate like parts in all the figures.

The object of my invention is a more efficient regulation of the velocity of the steam-engine, with a more economical employment of steam therein, than has been attained by the methods heretofore adopted; and my invention consists in effecting this object by a new mode of operation, which is embodied in a combination of two sets of apparatus, one of which I call the "regulator," and the other a "liberating valve-gear." The former is an instrument, which, when set in motion, changes the relative position of some of its parts as changes occur in its velocity, and by virtue of such changes is capable of communicating motion to other mechanism. The latter is a valve-gear which embodies two forces for operating the steam-valves—the one for their opening movement, which may be derived from the engine itself, the other for the closing movement, which may be derived from weights or springs or their equivalents; and while the arrangement may be such that the reciprocal operations of these two forces may give the proper movements for closing the valves at certain fixed periods of the stroke of the piston, there must be embodied a provision for effecting the closing of the valves at variable periods of the stroke by such a release of that portion of the valve-gear actuated by one force from that actuated by the other force as will anticipate the time at which the valves would be closed if their closing were effected by the return movements of the opening mechanism.

A liberating valve-gear presents, as I have discovered, peculiar features of adaptation for working in combination with a regulator, as it has the capability beyond other species of valve-gear of reducing the amount of power required of the regulator in controlling the periods of closing the valves, and also of reducing the range of movement required of the regulator in fulfilling the requirements of regulation; and though the regulator possesses a very limited amount of available force within the limits of variation in velocity consistent with proper regulation, yet that force may be so applied to a liberating valve-gear as to be felt at each stroke of the engine, and vary the period of cut-off to correspond with the changes in velocity.

I have represented my invention in the accompanying drawings as applied to an engine embodying various other inventions, a more full description of which is given in sundry patents granted to me bearing even date herewith. In this engine the steam and the exhaust valves *l l* and *m m* are situated in steam-chests *n o* at each extremity of the steam-cylinder. Each exhaust-valve *m* is attached to one extremity of a valve-rod, *p*, which is fitted at its opposite extremity with a sliding head, *q*, that is linked by a connecting-rod, *r*, to one arm, *s*, of a bell-crank, *t*. The other arm, *v*, of the bell-crank is connected by a rod with a wrist-pin, *w*, on the wrist-plate *x*. The latter is secured to a rock-shaft, to which the requisite vibratory motion is imparted by an eccentric, *a*, through the intervention of an eccentric-rod and an arm, *y*, secured to the rock-shaft, so that as the eccentric is caused to revolve with the crank-shaft the exhaust-valves are drawn open and are moved back to close their ports by the power of the engine, with the peculiarities of movement incident to the employment of the wrist-motion.

As, however, the wrist-motion forms no part of the invention set forth in this specification, a minute description of it herein is deemed unnecessary.

In the valve-gear thus far described each exhaust-valve is connected permanently with the eccentric through the intervention of the wrist-plate and its appurtenances, and the exhaust-valves are opened and closed wholly by the power of the engine.

The valve-gear for operating the steam-valves differs from that for the exhaust-valves in being constructed in parts which are separable from each other, so that each valve may be permitted to close independently of the power of the engine. A part of this valve-gear is connected permanently with each valve, and in the engine I am now describing the part for each valve consists of a double valve-rod, $b'$, upon which a weight, $o$, is arranged to act through the intervention of a bent lever or bell-crank, $m'$, to cause the valve to close its port whenever the part of the valve-gear connected with the valve is separated from the remainder of the valve-gear. The other part of the valve-gear consists, in this instance, of two sliding blocks, $g'$ $g'$, the bell cranks $f'$ $f'$, having teeth that engage with corresponding teeth in the blocks, the wrist-plate $x$ and its appurtenances, and the eccentric $a'$, with its appurtenances, the latter in its revolutions causing the sliding blocks to traverse to and fro. The part of the valve-gear connected permanently with each valve is fitted with a variable link or medium of connection, $h'$, which is hinged to the valve-rod $b'$, and has an acting face, $c$, which can be placed in contact with a corresponding face, $e$, formed upon the adjacent sliding block. When these two faces are in contact, the part of the valve-gear connected permanently with the valve is moved along with the remainder, so that the valve is drawn open and the weight lifted by the power of the engine, the two acting faces $c$ $e$ remaining in contact until a separation is made by a lateral movement of the one to the other. Such a lateral movement is effected in the present example, when steam is to be cut off, by means of a cam, $k'$, which is turned by the power of the engine, through the intervention of a series of shafts and wheels, the last of which is secured to the crank-shaft; and as in this engine the shank of the link is not within the range of motion of the cam, a projection, $j'$, is secured to the link, upon which the cam bears when a separation of the one part of the valve-gear from the other, and the consequent liberation of the steam-valve with its weight from the opening mechanism, takes place, and the valve is then instantly closed by the power of the weight. As the steam-valves in the steam engine represented move horizontally, they do not tend to close by their own weight, and are consequently closed by means of the weights $o'$ $o'$, arranged as before described.

In order to prevent the jar which would result from the sudden stoppage of the motion of the weights, each cross-block N has a cylindrical socket, $n$, Fig. 7, to contain atmospheric air, open toward the steam-cylinder, and a piston, $p'$, is secured to the engine-frame in such a position that it enters the cylindrical socket, and fitting the same, compresses the air therein, as the valve closes, to form an elastic cushion to prevent jar.

In order that each steam-valve may uncover its port at the proper moment to admit steam into the cylinder, the part of the valve-gear connected permanently with the eccentric is moved back by the operation of the eccentric, before the commencement of a stroke a sufficient distance to permit the acting face of the link to be moved laterally by a spring, $i''$, within the range of motion of the opposite acting face of the valve-gear, so that when the valve gear connected with the eccentric again moves forward the two parts of the valve-gear are connected by the link, and the valve is drawn open.

In the engine I have represented in the drawings the valves are moved in directions at right angles with the axis of the steam-cylinder, and the valve-gear is adapted to this arrangement of the valves. When, however, the valves are so arranged that they move parallel with the axis of the cylinder, as is the customary arrangement in slide-valve engines, the rock-shaft by which they are operated may with advantage be located in a position different from that described above, and the valve-connections must be adapted to this change.

We learn from standard works on the steam-engine that it has long been well known that great advantages in the economy of fuel would accrue from a change in the application of the regulator of steam-engines, from the throttle-valve to the expansion or cut-off valves; and yet, until the date of my invention the application of the regulator to the throttle-valve was practically the universal rule in working engines in all parts of the world, if we except a few doubtful instances of isolated engines of very limited capacity, those constructed with a liberating valve-gear forming no exception to that rule. One of the exceptions above referred to is described in "Tredgold's Treatise on the Steam-Engine," at page 283, article 492; and in the explanations of Plate XVI of that work, in which plate the engine is exhibited by drawings. Here the regulator is represented as applied to a rotating cam, upon which a puppet or lifting valve was raised, and, after being held up the required length of time, was lowered to its seat. As this cam was designed to govern, by its external form, the periods of opening and closing the valves, it was elongated, so as to admit within its length all the gradations of form requisite for closing the valve at earlier and later periods of the stroke of the piston, and then it was placed upon an axle in bearings which admitted of its endwise movement to the extent which was necessary for bringing, as required, the several gradations of form throughout its length, corresponding to the varying periods of closing, within the plane of movement of the valve-lever. The range of motion of the regulator was then adapted to the length of movement required by the length of the cam. This device is represented as applied, by way of experiment, to what is termed a "portable engine," and the valve operated by it is shown in the drawings side by side with the throttle-valve. Others of the exceptional engines referred to are described in a French publication entitled "Armengaud's Publication Industrielle, &c.," volume 5, Plate XXXVIII, and volume 6, Plates I and XII, and in the text of those volumes description of those plates and of the engines therein represented. In these engines, also, the regulator is applied to a cam the varying parts of whose surface are made to act upon the valve-rods so as to close the valves at varying periods of the stroke of the piston; but all these plans, under various arrangements of mechanism, embody a common method of operation—the same, substantially, as that in the engine referred to in Fredgold's Treatise. Another plan is described in a Scotch publication, "The Practical Mechanic and Engineer's Magazine," for April, 1846, pages 165 and 166, volume 1, consisting of a supplemental valve placed upon the back of the main steam-valve, upon which it rides as the latter is moved to and fro by an eccentric, and the arrangement is such that at certain times—viz., the varying periods in the stroke of the piston when the steam is to be cut off—the riding valve is held still by the regulator to allow the main valve to slide beneath it, and thus bring the steam-port of the main valve under the supplemental valve, and thereby cut off the flow of steam into the cylinder, the closing movement being determined by the form of the cam or eccentric which actuates the main valve.

The foregoing published methods of regulating the motion of steam-engines are types of classes of arrangements which have long been well known; but in all these the closing of the steam-valve through which the regulator operates is dependent upon the form of the cam by which the opening movement of the valve is effected, and not upon a liberation from the cam to permit the valve to be closed by a weight or spring or other equivalent means, so as to anticipate the time at which the valve would have been closed under the control of its opening mechanism if no such liberation had taken place. From these instances it will be seen that the employment of weights and springs in giving one movement to the valve, while the other is given by a cam, does not, of necessity, involve the use of a liberating valve-gear, as they may be used for keeping the valve mechanism in contact with the cam, and thereby keeping the valve in that position relatively to the other parts of the engine indicated by the form of the cam.

In the case cited from the Scotch publication the operation of the supplemental valve depends upon the arm held by the regulator as well as upon the cam attached to the crank-shaft, which is another instance of the employment of two forces for operating the valve without involving the features of a liberating valve-gear.

I wish it to be distinctly understood that the invention which I claim under this patent does not consist in the form of the regulator employed, nor in the form of the valves, nor in the form of the valve-gear for opening the valves, nor in the arrangement of devices for liberating the valves from the mechanism by which they are opened. Various forms of liberating valve-gear heretofore used in steam-engines may with good effect be combined with the regulator so as to control the periods of liberating the steam-valves, and thereby embody my invention.

In the form of steam-engine delineated in Fig. 2 the periods of liberating the valves may be varied by wedge-formed stops or cams substituted for the helical cams and connected with the slide of the regulator, which in that case should not turn. Cam-shaped or other forms of stops may be connected with the slide of the regulator by levers, so as to be moved in the plane of motion of the valve mechanism in such directions as to vary the periods of liberating one portion of that mechanism from the other. It is obvious that by such changes the form, arrangement, and operation of the mechanism of liberation might be greatly varied, while the mode of operation for effecting regulation would remain unchanged.

What I claim as my invention, and desire to secure by Letters Patent, is—

The method, substantially as described, of regulating the velocity of steam-engines by combining a regulator with a liberating valve-gear.

In testimony whereof I have hereunto subscribed my name.

GEORGE H. CORLISS.

Witnesses:
HENRY BALDWIN, Jr.,
JOHN S. HOLLINGSHEAD.